United States Patent [19]

Lindner

[11] 3,939,419

[45] Feb. 17, 1976

[54] SECURITY REMOTE CONTROL METHOD AND SYSTEM

[75] Inventor: Herbert G. Lindner, Red Bank, N.J.

[73] Assignee: The United States of America as represented by the Secretary of the Army, Washington, D.C.

[22] Filed: Nov. 6, 1956

[21] Appl. No.: 620,776

[52] U.S. Cl. ...................... 325/33; 325/37; 325/51; 325/60

[51] Int. Cl.[2] ...................... H04K 1/00; H04B 1/00

[58] Field of Search ............... 179/1.5; 343/100 CL; 325/33, 132, 37, 51, 60

[56] References Cited

UNITED STATES PATENTS 1,565,521 12/1925 Stone et al. .......................... 325/33

2,658,992 11/1953 Byrne .............................. 325/132

*Primary Examiner*—Maynard R. Wilbur
*Assistant Examiner*—S. C. Buczinski
*Attorney, Agent, or Firm*—Nathan Edelberg; Robert P. Gibson; Jeremiah G. Murray

EXEMPLARY CLAIM

1. A security remote control system comprising a pair of carrier generators, means for balance modulating both the carriers from said generators by a single source of noise at a first station and means for transmitting only the side bands, a receiver at a second station for said side bands, means for combining the side bands of said pair of carriers to provide a beat frequency signal corresponding to the frequency difference of said pair of carriers, narrow band filter means to isolate said signal, and means responsive to said signal for controlling an operation at said second station.

4 Claims, 1 Drawing Figure

INVENTOR,
HERBERT G. LINDNER.

BY

Harry M. Saragovitz
ATTORNEY.

SECURITY REMOTE CONTROL METHOD AND SYSTEM

The invention described herein may be manufactured and used by or for the Government for governmental purposes without the payment of any royalty thereon.

This invention relates to correlation systems of remote control. In the remote control of detonators it is necessary to assure operation at a desired time and yet avoid accidental operation. The use of correlation of apparently random noise is admirably suited to such a requirement since the noise signal can be very complex and therefore provides a wide band signal which is very difficult to jam or even to analyze and protects the system against failure of operation or accidental operation. Furthermore, extremely simple systems in the controlled station can be used for economy in production.

In the present invention the same noise source is used to modulate a plurality of suppressed carrier transmitters and the side bands corresponding to a pair of the carriers are combined at the receiver to produce a signal having a frequency equal to the difference in frequency between the pair of carriers from which the side bands had been derived. Further protection against accidental operation is normally accomplished by providing noise side bands corresponding to a plurality of pairs of such carriers and the resultant difference frequency signals in the receiver corresponding to each pair are further combined for the actual control of the detonator.

Such a system has many of the advantages of the device disclosed in my prior application for "Synchronization for Maximum Correlation", Filed: 12 June 1956, Ser. No. 590,999, now U.S. Pat. No. 3,016,519, but avoids the need for identical noise generators at both the transmitter and the remote control station. The ncessary delay involved in the synchronization of the prior device is also eliminated since the same noise source is supplied to the various suppressed carrier transmitters and therefore is inherently synchronized. The receiver of the new system is also made passive in nature except for necessary amplification since it is not necessary to have a continuously running noise generator in the receiving apparatus.

The choice of the particular one of the detonator systems will depend on the particular installation, the degree of security required, and various other factors involved in military operations.

The object of this invention is to simplify expendable remote control devices without losing the desired control of the operation in failing to operate when desired or operating when not desired.

Figure 1:
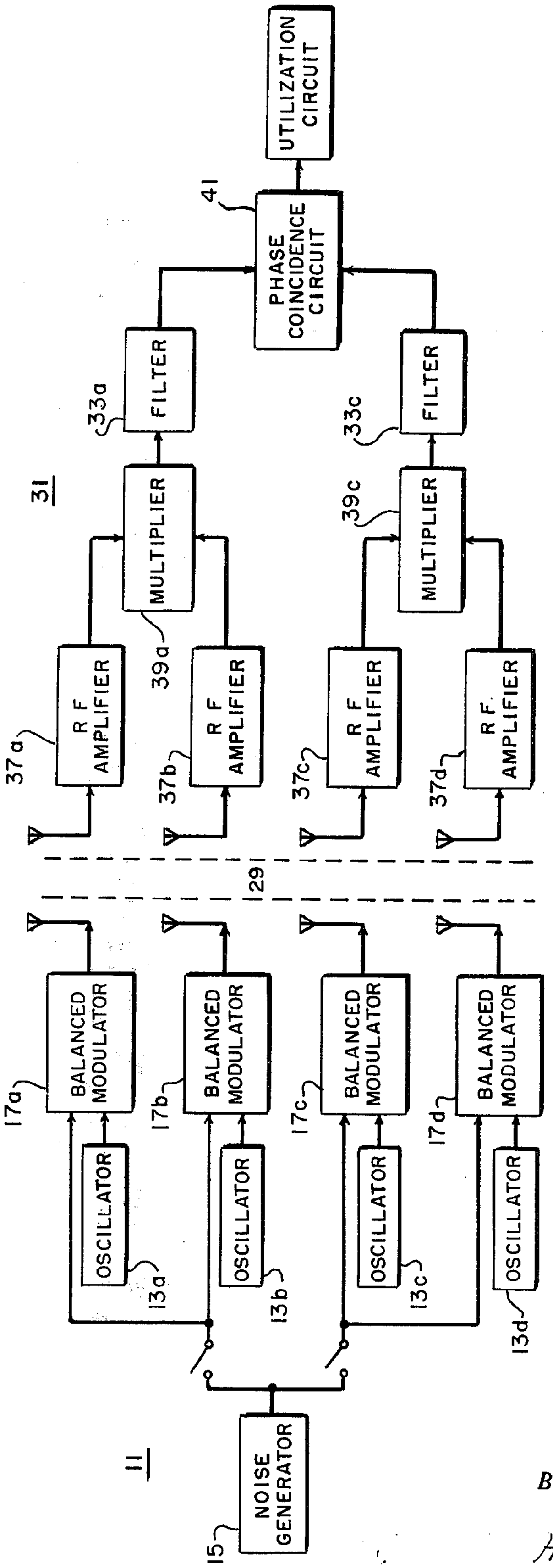
Figure 2:
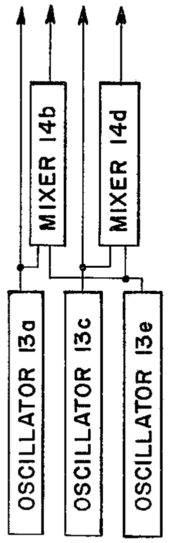

Further objects of the invention will become apparent in the following description of the invention in connection with the accompanying drawing, in which:

FIG. 1 shows one simple embodiment of the invention using a single noise source at the first station modulating a plurality of suppressed carrier transmitters;

And FIG. 2 illustrates use of a conventional heterodyne circuit to assure the same known difference in frequency between two pairs of carriers, which may be used in the system of FIG. 1.

In FIG. 1 the transmission system 11 includes a plurality of carrier oscillators 13*a* to *d* and a single random noise source 15 providing the inputs to a plurality of balanced modulators 17*a* to *d* used as suppressed carrier modulators and transmitters. In this embodiment of the invention the difference in frequency between the outputs of oscillators 13*a* to *b* is exactly equal to the difference in frequency between the outputs of oscillators 13*c* and *d*. In this invention it is not necessary that the noise source should be pre-scheduled since there is no corresponding circuit in the receiver which must be matched to the noise source. Therefore, any available source of noise in the desired frequency range can be utilized. As more fully analyzed in applicant's copending application for "Communication Security Method and System", filed April 16, 1956, Ser. No. 580,158, the transmitter in effect multiplies the two inputs together and transmits the product over transmitting medium 29. When the random noise source is applied the carrier would be reversed in phase one half of the time and therefore only the side bands would be actually transmitted.

In the receiving system 31 the transmitted side bands corresponding to the respective carriers are received on RF amplifiers 37*a* to *d*. The outputs of amplifiers 37*a* and *b*. are combined in multiplier 39*a* then supplied to a filter 33*a* sharply tuned to a frequency equal to the difference between the frequencies of the carriers supplied by the oscillators 13*a* and *b*. Similarly the outputs of receiver amplifiers 37*c* and *d* are combined in multiplier 39*c* then supplied to a filter 33*c* sharply tuned to a frequency equal to the difference between the frequencies of the carriers supplied by the oscillators 13*c* and *d*.

The outputs to filters 33*a* and *c* are also supplied to a phase coincidence circuit 41. Since the difference in frequency between the carriers supplied to balanced modulators 17*a* and *b* is exactly equal to the difference in frequency between the carriers supplied to balanced modulators 17*c* and *d*, the filter outputs will also be of identical frequency and therefore the output of phase coincidence circuit 41 will be continuous. It will be realized that the two filter outputs must be in a suitable phase relation for effective operation of the phase coincidence circuit 41; this ordinarily would be arranged in the original adjustment of the circuits. The reason why the output of filters 33*a* and *c* would correspond exactly to the difference in frequency between the oscillators 13*a* and *b* and 13*c* and *d* respectively will be apparent from the analysis in the prior application, U.S. Ser. No. 580,158. It is well known that two different frequencies supplied to a balanced modulator provide strong signal outputs of the sum and difference frequency, actually reversals in phase of the original carrier by the original modulation (or even reversals of the modulation by the carrier). Since the balanced modulator is actually a multiplier, it will also be apparent that even when the original carriers have both been inverted in phase by the same simple or complex wave in the balanced modulators of the transmitting system the output of the receiver multiplier will be unchanged since both signals have been reversed in polarity and therefore their product has the same algebraic sign as before.

Preferably the bandwidth of the various sets of side bands should be less than the frequency difference of the respective pairs of carriers to avoid overlapping and consequent broadening of the energy distribution versus frequency in the output from the multipliers to the filters relative to the energy at the difference frequency of the two carriers. Similarly the RF amplifiers would each be designed to receive the side bands of a single carrier.

In FIG. 2 one suitable substitute for the four oscillators 13*a* to *d* (to assure identical frequency differences between the pairs of carriers) is shown in elementary form as a pair of oscillators 13*a* and *c*, an additional oscillator 13*e*, and a pair of heterodyne mixers 14*b* and *D*. Identifying the frequencies by the corresponding letters the mere addition of voltages in 14*b* would give frequency components $Fa \pm Fe$ and similarly in 14*d* would give $Fc \pm Fe$ due to circuit non-linearities. The difference or beat frequency is apparent as an envelope of the combined wave and is normally selected as the output; the sum frequency is less apparent but may be selected instead (in both mixers). Thus the output frequencies would be $Fa$ in 13*a*, $Fa- fe$ in 14*b*, $Fc$ in 13*c* and $Fc - Fe$ in 14*d;* the difference between 13*a* and 14*b* would be $F2$ - $(Fa - F e)$, or $Fe$, and the difference between 13*c* and 14*d* would be $Fc$ $(Fc - Fe)$, also $Fe$. This difference frequency Fe generated in the transmitter system will also occur at the filters of the receiver system. It may be helpful to an understanding of the operation to recognize that the differences might be equal even if some of the inputs were not steady state signals. However, in some cases the circuitry might not be suitable; for example, if oscillator 13*e* did not match filters 13*a* and *c* operation might fail. While other techniques might be used this is one of the simplest in operation, explanation and apparatus requirements; even if somewhat separate oscillators were used the necessary frequency control normally would be based on heterodyne mixer techniques.

In some situations the output of one of the filters 33*a* or *c* could be used directly for control of the detonator. However, the use of two filter outputs derived from the side bands corresponding to four carriers provides greater security against the possibility that random signals from some other source might cause an undesired operation of the output circuit.

As indicated in application Ser. No. 580,158 the sharpness of tuning of the filters is limited only by the desired time of buildup. Since systems of this nature would normally be used over a fairly short range any potential difficulty from differences in propagation of the various frequency components would be minimized.

There are too many variables for any effective operation by an enemy since such operation would require the approximate carrier frequency, exact difference frequencies, and phase relation of the two different frequencies. These variables may be even further extended by the use of unequal difference frequencies, merely requiring modification of the phase coincidence circuit, and a different noise source for each pair of carriers. Furthermore, the actual use of the system is effectively concealed by suppressing the carriers and transmitting only the noise modulation side bands which are very difficult to analyze, particularly during the brief period required for detonation.

One typical application of the invention has been described to facilitate an understanding of the operation but many variations will be apparent to those skilled in the art.

What is claimed is:

1. A security remote control system comprising a pair of carrier generators, means for balance modulating both the carriers from said generators by a single source of noise at a first station and means for transmitting only the side bands, a receiver at a second station for said side bands, means for combining the side bands of said pair of carriers to provide a beat frequency signal corresponding to the frequency difference of said pair of carriers, narrow band filter means to isolate said signal, and means responsive to said signal for controlling an operation at said second station.

2. A security remote control system comprising a plurality of carrier generators, means for modulating the carriers from said generators by noise at a first station and transmitting only the side bands, a receiver for said side bands at a second station, means for combining the side bands of one pair of said carriers both modulated by the same source of noise to provide a beat frequency signal corresponding to the frequency difference of said one pair of carriers, means for combining the side bands of a second pair of said carriers also both modulated by the same source of noise to provide a second beat frequency signal corresponding to the frequency difference of said second pair of carriers, narrow band filter means to isolate each of said signals, and means responsive to a combination of said signals for controlling an operation at said second station.

3. A security remote control system comprising a plurality of carrier generators, means for modulating the carriers from said generators by noise at a first station and transmitting only the side bands, a receiver at a second station for the side bands of said carriers, means for combining the side bands of one pair of said carriers both modulated by the same source of noise to provide one beat frequency signal corresponding to the frequency difference of said one pair of carriers, means for combining the side bands of a second pair of said carriers also both modulated by the same source of noise to provide a second beat frequency signal corresponding to the frequency difference of said second pair of carriers, said frequency differences being maintained equal at said first station, narrow band filter means to isolate each of said signals and means responsive to the combination of said equal frequency signals for controlling an operation at said second station.

4. A security remote control system comprising a plurality of carrier generators, means for modulating the carriers from said generators by a single source of noise at a first station and transmitting only the side bands, a receiver at a second station for said side bands, means for combining the side bands of one pair of said carriers to provide a beat frequency signal corresponding to the frequency difference of said one pair of carriers, means for combining the side bands of a second pair of said carriers to provide a second beat frequency signal corresponding to the frequency difference of said second pair of carriers, said frequency differences being maintained equal at said first station, narrow band filter means to isolate each of said signals and means responsive to the combination of said equal frequency signals for controlling an operation at said second station.

* * * * *